(12) United States Patent
Chao et al.

(10) Patent No.: US 6,920,365 B2
(45) Date of Patent: Jul. 19, 2005

(54) SYSTEM AND METHOD FOR PULL-IN ORDER PLANNING AND CONTROL

(75) Inventors: Jen-Lin Chao, Hsinchu (TW); Chao-Hsien Lin, Miaoli (TW); Chen-Wei Hsu, Hsinchu (TW); Chin-Yung Chang, Hsinchu (TW)

(73) Assignee: Taiwan Semiconductor Manufacturing Co., Ltd., Hsinchu (TW)

(*) Notice: Subject to any disclaimer, the term of this patent is extended or adjusted under 35 U.S.C. 154(b) by 10 days.

(21) Appl. No.: 10/740,258

(22) Filed: Dec. 18, 2003

(65) Prior Publication Data

US 2005/0137733 A1 Jun. 23, 2005

(51) Int. Cl.$^7$ ............................................. G06F 19/00
(52) U.S. Cl. ........................................ 700/100; 700/95
(58) Field of Search .................... 700/100, 95

(56) References Cited

U.S. PATENT DOCUMENTS 6,415,195 B1 * 7/2002 Gleditsch et al. ............. 700/99

* cited by examiner

Primary Examiner—Leo Picard
Assistant Examiner—Sheela S. Rao
(74) Attorney, Agent, or Firm—Thomas, Kayden, Horstemeyer & Risley (57) ABSTRACT

A system for planning and controlling a pull-in request of an order with demanded capacity in a production system. A plan engine is programmed to receive a pull-in request for the order, release original demanded capacity, reserve a capacity for the pull-in order, and generate a fixed production schedule for the pull-in order based on a capacity model that considers a plurality of capacity vectors in the production system. A production schedule monitor and evaluation module determines whether the relevant current pull-in order conforms to the fixed production schedule and whether to adjust the fixed production schedule when the relevant current pull-in order deviates from the fixed production schedule.

40 Claims, 6 Drawing Sheets

SYSTEM AND METHOD FOR PULL-IN ORDER PLANNING AND CONTROL

BACKGROUND OF THE INVENTION

1. Field of the Invention

The present invention relates to manufacturing management, and in particular to a system and method of pull-in planning and control with a fixed planning schedule for an order.

2. Description of the Related Art

Supply chain is important for modern enterprises, systemizing purchase of materials, transformation of materials into intermediate and finished products, and distribution of finished products. In the supply chain, customers transmit requests (demands) consisting of a request for a particular quantity of a product by a specific date to a manufacturer, and the manufacturer plans its manufacturing schedule according to these received requests to satisfy each customer.

Supply chain management has become an important issue to meet the goals of reduced inventory and increased productivity. Conventionally, resources and facilities of a production system are regarded as limiting factors. Therefore, not every customer request may be met, since some may be promised, some may suffer inadequate supply, and others rejected. Consequently, effective demand and capacity management in supply chain management without excess capacity loss has become fundamental and critical for most manufacturing and distribution organizations.

Supply chains exist in both service and manufacturing organizations, although the complexity of the chain may vary greatly from industry to industry and firm to firm. For integrated circuit (IC) foundries, the manufacturing process of each IC product is complicated and varies and the cost of wafers and capacity is relatively high.

Many commercial supply chain solution providers provide packaged systems for clients to install and follow, such as i2 technology or ADEXA Inc. For a manufacturer or a factory, customers assign forecast demands prior to seasons or months. Commercial supply chain providers usually provide a demand planning engine to allocate demand in further production. A production scheduling engine is also embedded in the commercial supply chain systems to arrange resources and materials for a production plan when a customer decides to purchase an order from the foundry. The production scheduling engine provides a master production schedule (MPS) for the manufacturer or factory to follow. However, conventional production scheduling engines are designed to meet the best interests of the manufacturer or factory. More specifically, conventional production scheduling engines are programmed to generate a minimum-cost, optimal-capacity, and low-inventory MPS.

For IC foundries, conventional production scheduling engines recalculate and generate an updated MPS to optimize resources and capacity when receiving new orders. When lots are running (hereinafter referred to as work-in-process), the MPS is still changed, indicating rolling production schedules for running lots for optimization of foundry resources. It becomes difficult to promise delivery of the lots because of the rolling MPS.

In addition, customers sometimes submit pull-in orders, for many reasons. For example, if a customer has booked a capacity to fabricate an order of a product in December, but, due to high demand for the product on the market, the customer decides to prioritize the order for delivery in mid-September, it will be difficult for the foundry to promise which day or week in September that they can deliver the pull-in order because of the rolling MPS. Conventional planning engines continually update the MPS of the pull-in order, making it difficult to provide the customer with an exact delivery date. For customers, the uncertainty will disrupt transport and inventory planning and management.

In addition, the rolling MPS encourages customer pull-in behavior. Since the foundry is unable to deliver the order with a commit date by the conventional rolling MPS plan engine, customers tend to place the pull-in order prior to their original demand to prevent delivery delay. The pull-in behavior can be severely detrimental to the production system because it changes the original demand planning and can cause production disorder when many orders are unexpectedly changed to pull-in status.

SUMMARY OF THE INVENTION

Accordingly, an object of the invention is to provide a computer implemented system and method for pull-in order planning and control in a production system, which generates a fixed production schedule of a pull-in order for the production system to follow.

Another object of the invention is to provide a pull-in order planning and control system and method to deliver the pull-in order with a fixed schedule.

Still anther object of the invention is to provide a system and method to determine a service level for pull-in orders in a production system.

To achieve the above and other objects, the invention is directed to novel systems and methods for overcoming conventional pull-in order planning and control problems. In one embodiment, a system provides the planning and control of a pull-in request of an order with demanded capacity in a production system. A plan engine is programmed to receive a pull-in request for the order, release original demanded capacity, reserve a capacity for the pull-in order and generate a fixed production schedule for the pull-in order based on a capacity model that considers a plurality of capacity vectors in the production system. A production schedule monitor and evaluation module determines whether the relevant current pull-in order conforms to the fixed production schedule and whether to adjust the fixed production schedule when the relevant current pull-in order deviates from the fixed production schedule.

Preferably, a dynamic achievement model of historical fixed production schedules is introduced into the above system to evaluate the fixed production schedule, wherein the model is based on historical production information in the production database.

In another embodiment, a computer-implemented system provides a service level determination for pull-in order service in a production system. A plan engine is programmed to receive a pull-in request for an order, release an original demanded capacity of the pull-in order, reserve a capacity for the pull-in order, and generate a fixed production schedule for the pull-in order based on a capacity model that considers a plurality of capacity vectors within the production system. A dynamic achievement model of historical fixed production schedules is based on relationships between historical fixed production schedule achievement rate, fixed production schedule adjustment rate, and manufacturing capability accessed from a production database that stores production information of the production system. A production schedule monitor and evaluation module determines whether the relevant current pull-in order conforms to the fixed production schedule and whether to adjust the fixed production schedule based on the dynamic achievement model when the order in process deviates from the fixed production schedule. A pull-in model is based on relationships between the historical fixed production schedule achievement rate, the fixed production schedule adjustment rate and pull-in demand to define a working area of the fixed production schedule achievement rate and the fixed production schedule adjustment rate in the pull-in model with a minimum pull-in demand and determine a service level accordingly.

In still another embodiment, a method provides service level determination for pull-in order service in an IC foundry. A production database is provided to store production information in the IC foundry. A plurality of pull-in orders are manufactured with corresponding fixed production schedules. A fixed production schedule achievement rate, a fixed production schedule adjustment rate, and a demand of pull-in orders are calculated from historical data stored in the production database. A model with relationships between the fixed production schedule achievement rate, the fixed production schedule adjustment rate, and the demand of pull-in orders is built accordingly. A working area of the fixed production schedule achievement rate and the fixed production schedule adjustment rate in the model is defined with a minimum pull-in demand.

One feature of an embodiment of the present invention is fixed production schedule generation for pull-in orders. The production system is designated to follow the fixed production schedule to manufacture an order of lots. It allows the production system to fasten on the fixed planning schedule to deliver the pull-in order of lots on time. In addition, it allows a production system to promise the client a delivery date for their pull-in orders.

Another feature of an embodiment of the present invention evaluates the fixed planning schedule according to historical performance approach. The conformability of fixed planning schedules and the actual progress of the orders can be evaluated and adjusted according to a production schedule monitoring and evaluation model based on historical results.

Still another feature of an embodiment of the invention determines a working area and a service level of pull-in orders for a production system to reduce pull-in demands.

A detailed description is given in the following fixed planning schedule embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

As will be appreciated by persons skilled in the art from the discussion herein, the present invention has wide applicability to many manufacturers and many industries. For discussion purposes, illustration is made herein to semiconductor foundry manufacturing (i.e., wafer fabrication in an IC foundry). However, the present invention is not limited thereto.

As summarized above, the present invention is directed to novel systems and methods for overcoming conventional pull-in order planning and control problems.

Embodiment I: Fixed MPS Generation for Pull-in Order

In the IC industry, customers submit forecast orders to an IC foundry according to their market plan. The IC foundry reserves capacity for each order based on a capacity model. For various reasons, customers may later submit pull-in versions of original orders for advance production due to high market or uncertainty regarding the on-time delivery capability of the IC foundry.

Figure 1:
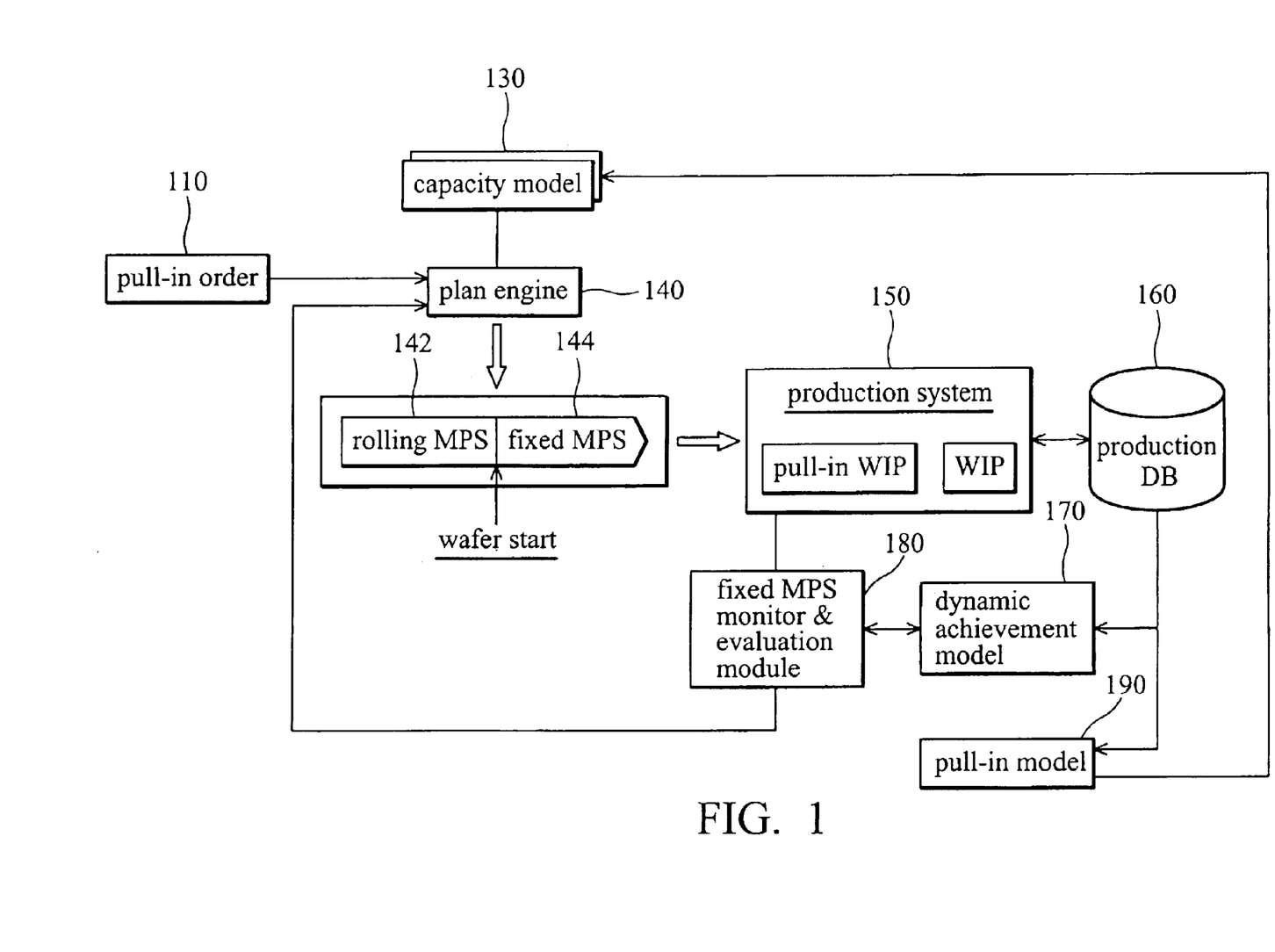
FIG. 1 is a schematic of the system structure for pull-in order planning and control in an IC foundry to generate a fixed production schedule according to one embodiment of the invention.

FIG. 1 is a system structure illustrating pull-in order planning and control in an IC foundry utilizing a fixed production schedule according to one embodiment of the invention. As shown in FIG. 1, a customer (not shown) requests the IC foundry to pull in an order 110 for a product, such as 200 count wafers of graphic chips. A plan engine 140 receives the pull-in request and releases the original demanded capacity reserved for the order 110. The pull-in request is initiated to advance the production time or delivery time beyond the original plan and therefore the original reserved capacity can be released for other use. To fulfill the pull-in demand, the plan engine 140 reserves a capacity for the pull-in order 110 based on the pull-in requirement and capacity model 130. The capacity model 130 considers a plurality of capacity vectors in the IC foundry, such as total capacity, reserved capacity, free capacity, fabrication technology, product characteristics, route information for products, and/or customer priority. The plan engine 140 searches the remaining free capacity according to the pull-in requirement and reserves accordingly for the pull-in order 110.

In a preferred embodiment, if insufficient capacity is available, the plan engine 140 switches capacity with other orders. For example, plan engine 140 postpones minor orders and releases the capacity for the pull-in order production. When capacity is available, plan engine 140 generates a fixed master production schedule (hereinafter referred to as MPS) 144 for the pull-in order 110 based on the capacity model 130. Generally, the pull-in order 110 can be divided into a plurality of lots based on the processing unit. For example, an order of 200 count wafers is divided into 8 lots based on a unit of 25 count wafers as one lot. The lots of the pull-in order 110 are all assigned with a fixed MPS 144.

In a preferred embodiment, the plan engine 140 generates rolling MPS 142 for the pull-in order 110 for planning optimization until the production system 150 begins to run the pull-in lots of the order 110. More specifically, the plan engine 140 continually updates the MPS 142 according to the latest production status before the lots of pull-in order 110 start to run. Plan engine 140 assigns the latest MPS 142 for the order 110 as the fixed MPS 144. The production system 150 is assigned to follow the fixed MPS 144 to fabricate the lots of the pull-in order 110 (hereinafter referred to as work-in-process, lots-in-process, or order-in-process). Preferably, the production system 150 further feeds back the fabrication progress of work-in-process to the capacity model 130 for adjustment. All of the production information of the IC foundry is stored in a production database 160.

Figure 2A:
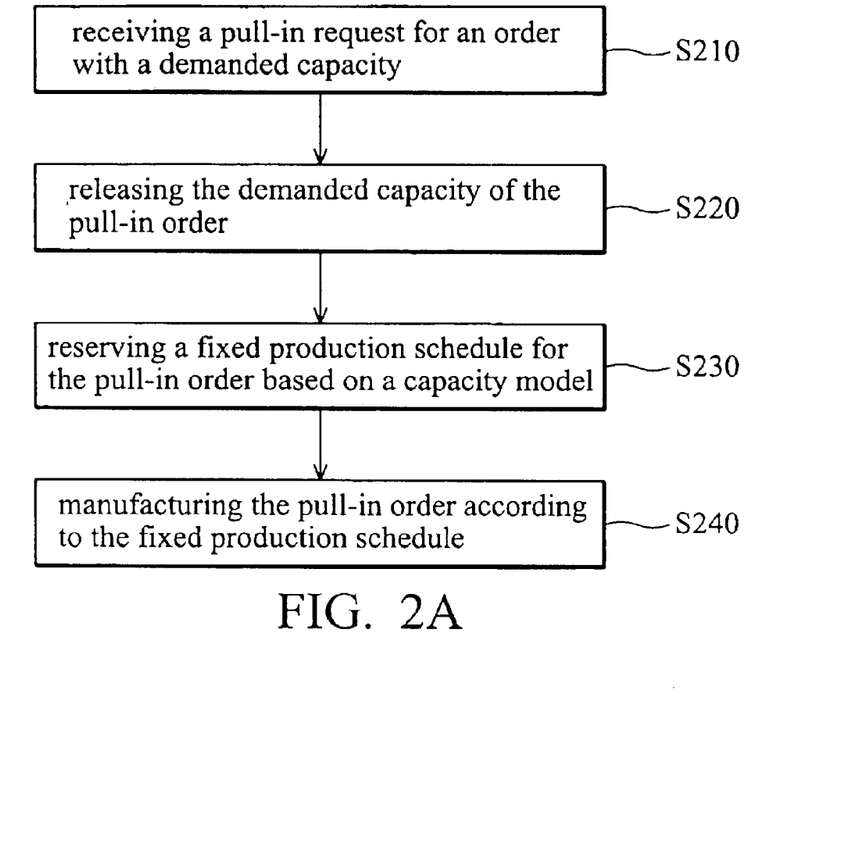
FIGS. 2A and 2B are flowcharts of methods for pull-in planning in an IC foundry of an order of a product with a demanded capacity, according to the system in FIG. 1.

FIG. 2A illustrates a flowchart of a method for pull-in planning in an IC foundry of an order of a product with a demanded capacity, according to the system in FIG. 1. In step S210, the plan engine 140 receives a pull-in request for the order 110. The plan engine 140 releases the demanded capacity of the pull-in order 110 in step S220. In step S230, The plan engine 140 reserves a fixed MPS for the pull-in order 110 based on the capacity model 130. The pull-in order 110 is then manufactured following the fixed MPS 144 in step 240.

Conventionally, the MPS is still rolled and updated after the pull-in order is in process to optimize the production system. A disadvantage here is that the lots of the pull-in order will be assigned with a rolling MPS for the best interest of the production system, such as lower cost or labor, and consequently the lots are delivered at separate times. In addition, the customers are therefore unable to confirm receipt of their pull-in order since the MPS thereof is continually updated according the latest status of the production system. The present invention provides a fixed MPS generation system and method for a production system to follow and achieve on-time delivery of the lots of the pull-in order.

Embodiment II: Fixed MPS Evaluation and Adjustment

FIG. 1 further shows a system structure to evaluate a fixed production schedule in the IC foundry according to one embodiment of the invention. A production schedule monitor and evaluation module 180 is programmed to determine whether the relevant current pull-in order 110 conforms to the fixed production schedule 144. To achieve this, a dynamic achievement model 170 of historical fixed production schedules is based on historical production information in the production database 160. The production schedule monitor and evaluation module 180 determines whether the relevant current pull-in order 110 conforms to the fixed production schedule 144 and whether to adjust the fixed MPS 144 based on the dynamic achievement model when the order in process deviates from the fixed production schedule 144.

Figure 3:
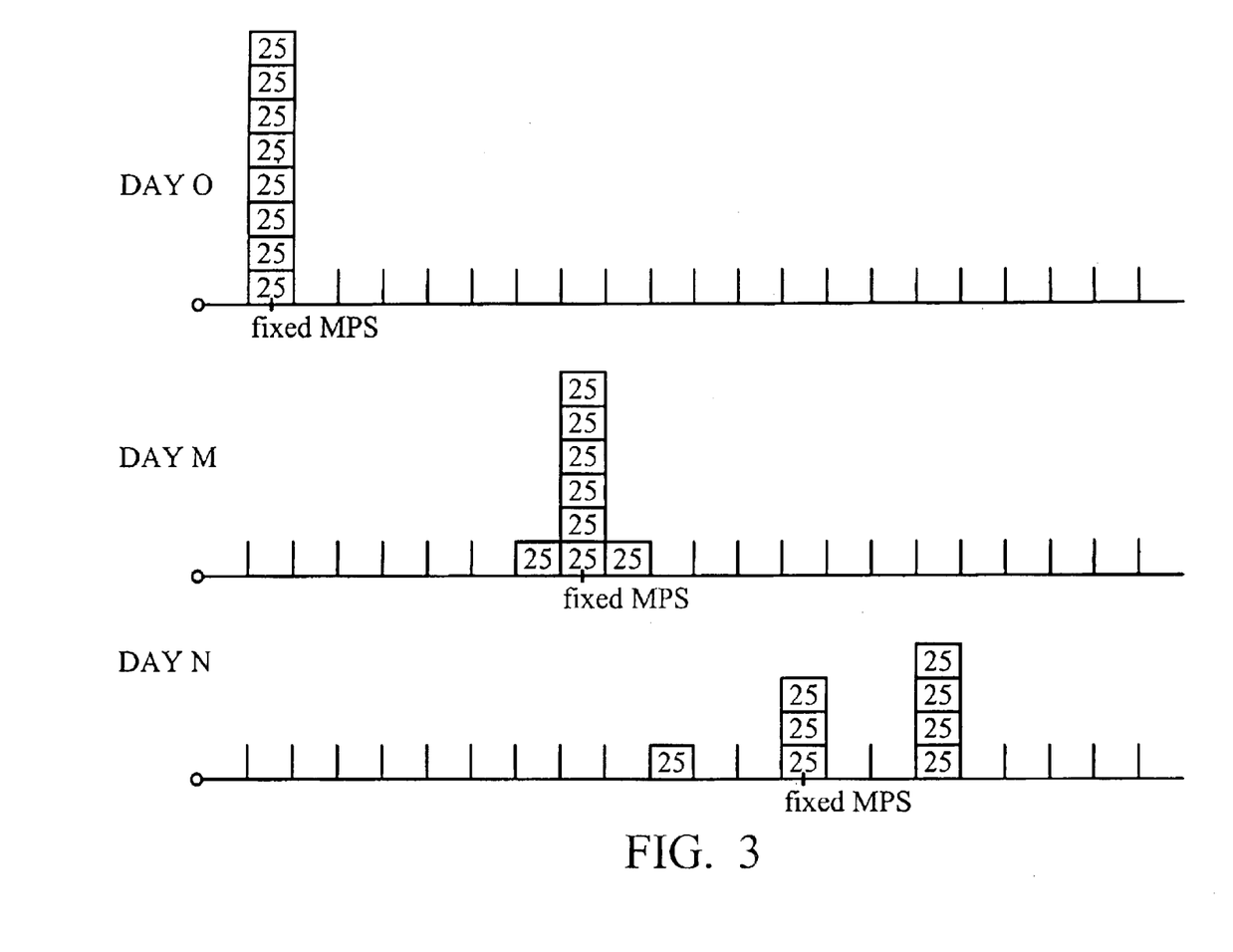
FIG. 3 is a distribution of the lots of an pull-in order during processing according to one embodiment of the invention.

FIG. 3 illustrates a distribution of the pull-in lots during processing according to one embodiment of the invention. Generally, the production system 150 follows the fixed MPS 144 to fabricate the lots of pull-in order 110. However, the lots of the pull-in order 110 may not fully conform to the fixed MPS 144. As shown in FIG. 3, the pull-in order 110 with 200 count wafers divided into 8 lots is fabricated from DAY 0. On DAY M, 6 lots are still together but one lot is ahead and another behind. On DAY N, four lots are fabricated beforehand and one lot is left behind. Only three lots thus conform to the fixed MPS 144.

The production schedule monitor and evaluation module 180 monitors the distribution of the lots of the pull-in order 110 and decides whether to adjust the fixed production schedule when the order in process deviates from the fixed production schedule.

Preferably, a dynamic achievement model 170 of historical fixed production schedules is provided as shown in FIG. 1, based on historical production information in a production database 160 for production schedule monitor and evaluation module 180 to evaluate the deviation in the order-in-process.

Figure 4:
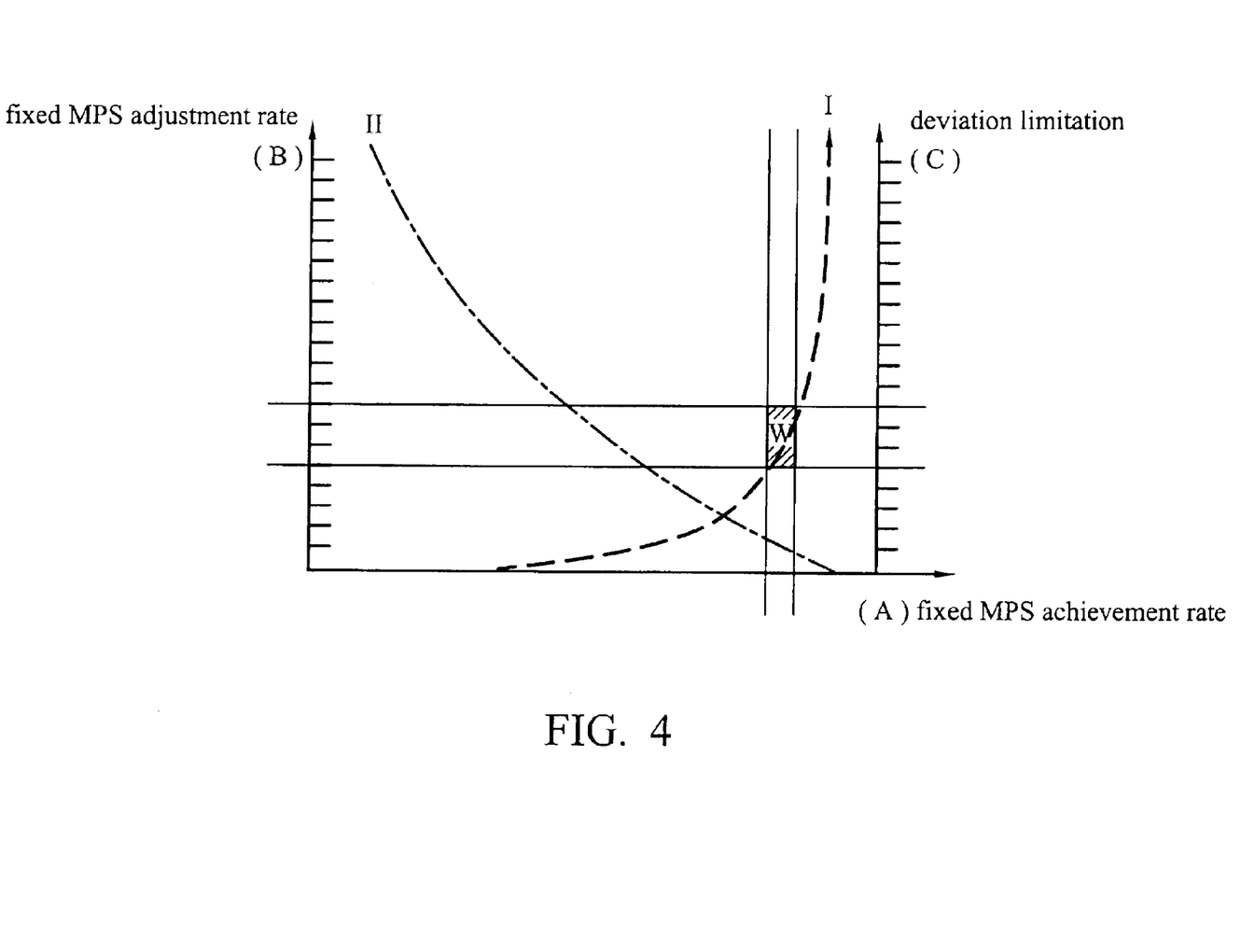
FIG. 4 is a dynamic achievement model of historical fixed production schedules according to one embodiment of the invention.

FIG. 4 illustrates a dynamic achievement model 170 of historical fixed production schedules according to one embodiment of the invention. Preferably, the dynamic achievement model 170 of historical fixed production schedules comprises a relationship between fixed production schedule achievement rate (coordinate A), fixed production schedule adjustment rate (coordinate B) and deviation limitation (coordinate C). The deviation limitation is the deviation between the fixed MPS and actual progress of which the IC foundry is capable, an indicator of its manufacturing capability.

According to historical fabrication information in one embodiment, a model of fixed MPS achievement is shown in FIG. 4. Curve I illustrates the relationship between the fixed MPS achievement rate and the fixed MPS adjustment rate. As curve I shows in FIG. 4, the more frequent the fixed MPS adjustment, the higher the fixed MPS achievement rate. Curve II illustrates the relationship between the fixed MPS achievement rate and the deviation limitation of production system 150. The higher the deviation limitation of production system 150, indicating the capability of the IC foundry to recover from the deviation, the lower the fixed MPS achievement rate.

Based on the model shown in FIG. 4, an optimal working area (W) is further defined, based on the relationships to evaluate whether to adjust the fixed production schedule of the pull-in order 110. The working area (W) is assigned with a range within which the fixed MPS is adjusted but improvement in the fixed MPS achievement rate and the range of the most capable deviation limitation within which the production system 150 can attain the fixed MPS. The production schedule monitor and evaluation module 180 determines whether to adjust the fixed production schedule based on the working area (W) of the dynamic achievement model when the progress of the pull-in order 110 deviates from the fixed MPS. As shown in FIG. 3, when the lots on DAY N deviate from the working area (w) of the fixed MPS but are still within the working area of the fixed MPS adjustment rate, a new fixed MPS of the pull-in order 110 is re-generated by the plan engine 140 according to the deviation degree and the latest status of the IC foundry for order-in-process to follow. The working area (W) provides a range within which a low fixed MPS adjustment rate and a high fixed MPS achievement rate are obtained for the IC foundry to maintain optimum parameters of both the customers and the IC foundry.

Figure 2B:
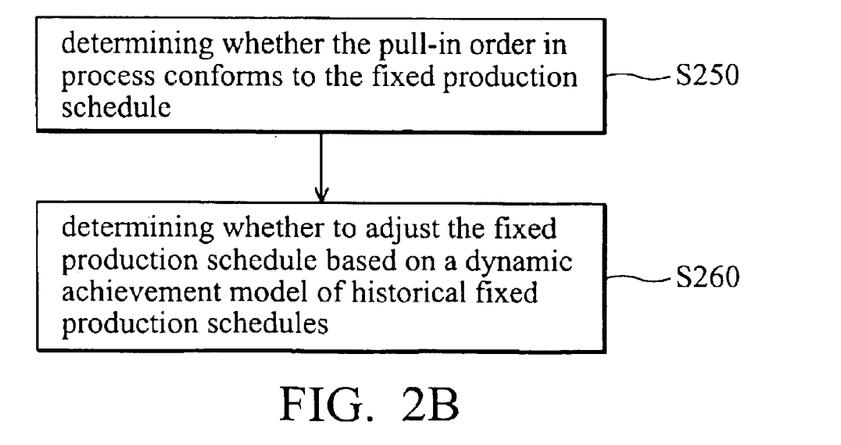

FIG. 2B illustrates another flowchart of the method for pull-in planning in an IC foundry of an order of a product with a demanded capacity, according to the system in FIG. 1.

In step 250, the production schedule monitor and evaluation module 180 determines whether the relevant current pull-in order conforms to the fixed production schedule. If not, the production schedule monitor and evaluation module 180 determines whether to adjust the fixed MPS based on the dynamic achievement model 170 of historical fixed production schedules in step 260.

The above embodiment illustrates evaluation and adjustment of a fixed production schedule of pull-in orders in a production system to maintain flexibility and real-time control with the implementation of fixed production schedule and therefore provide predictable manufacturing schedules.

In another embodiment, a storage medium is further provided for storing a computer program providing a method of pull-in planning in a production system of an pull-in order with a demanded capacity. The storage medium method comprises using a computer to receive a pull-in request for an order of an IC product, releasing the demanded capacity of the pull-in order, reserving a capacity and generating a fixed production schedule therefor, detecting whether the relevant current pull-in order conforms to the fixed production schedule, and adjusting the fixed production schedule referring to a dynamic achievement model of historical fixed production schedules when the relevant current pull-in order does not conform to the fixed production schedule.

Embodiment III: Fixed MPS Evaluation and Adjustment

FIG. 1 further shows a system structure to determine pull-in order service in an IC foundry according to one embodiment of the invention. In FIG. 1, a pull-in model 190 provides a service level determination.

Figure 5:
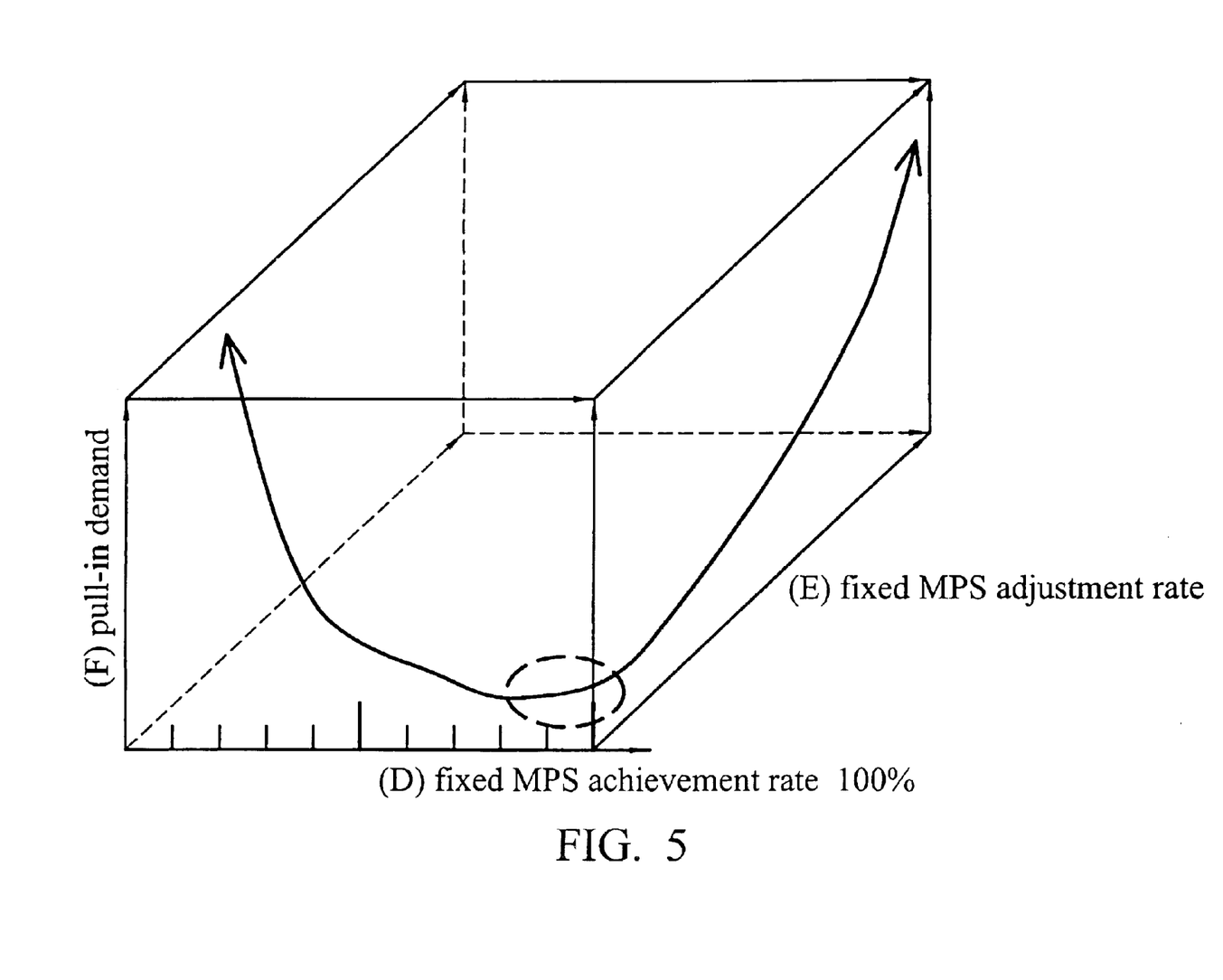
FIG. 5 is a pull-in model according to an embodiment of the invention.

FIG. 5 illustrates a pull-in model 190 based on relationships between the historical fixed MPS achievement rate (coordinate D), the fixed MPS adjustment rate (coordinate E) and pull-in demand (coordinate F) according to an embodiment of the invention. Preferably, the pull-in model 190 is based on the dynamic achievement model 170. Therefore, a working area (W) is defined as an intersection of the fixed MPS achievement rate (D) and the fixed MPS adjustment rate (E) with a minimum pull-in demand (F) in the pull-in model 190. As shown in FIG. 5, unstable delivery, i.e. high fixed MPS adjustment rate, results in high pull-in demand from customers based on coordination with the frequently adjusted fixed MPS. Moreover, if the IC foundry maintains a fixed MPS beyond its capability, the low fixed MPS achievement rate also results in pull-in demand from the customer because the IC foundry is unable to deliver the order as promised. Thus, an optimal working area (w) is the intersection of high fixed MPS achievement rate (D), low fixed MPS adjustment rate (E) and low pull-in demand (F) as shown in FIG. 5.

Moreover, a service level of the IC foundry can be evaluated accordingly. The capability of the IC foundry is evaluated based on whether the working area is achievable according to the present manufacturing capability of the IC foundry. If not, the service level is too low and will possibly result in a high demand of pull-in requests; and the IC foundry needs to adjust their resources to elevate their service level to approach the optimal working area.

Figure 6:
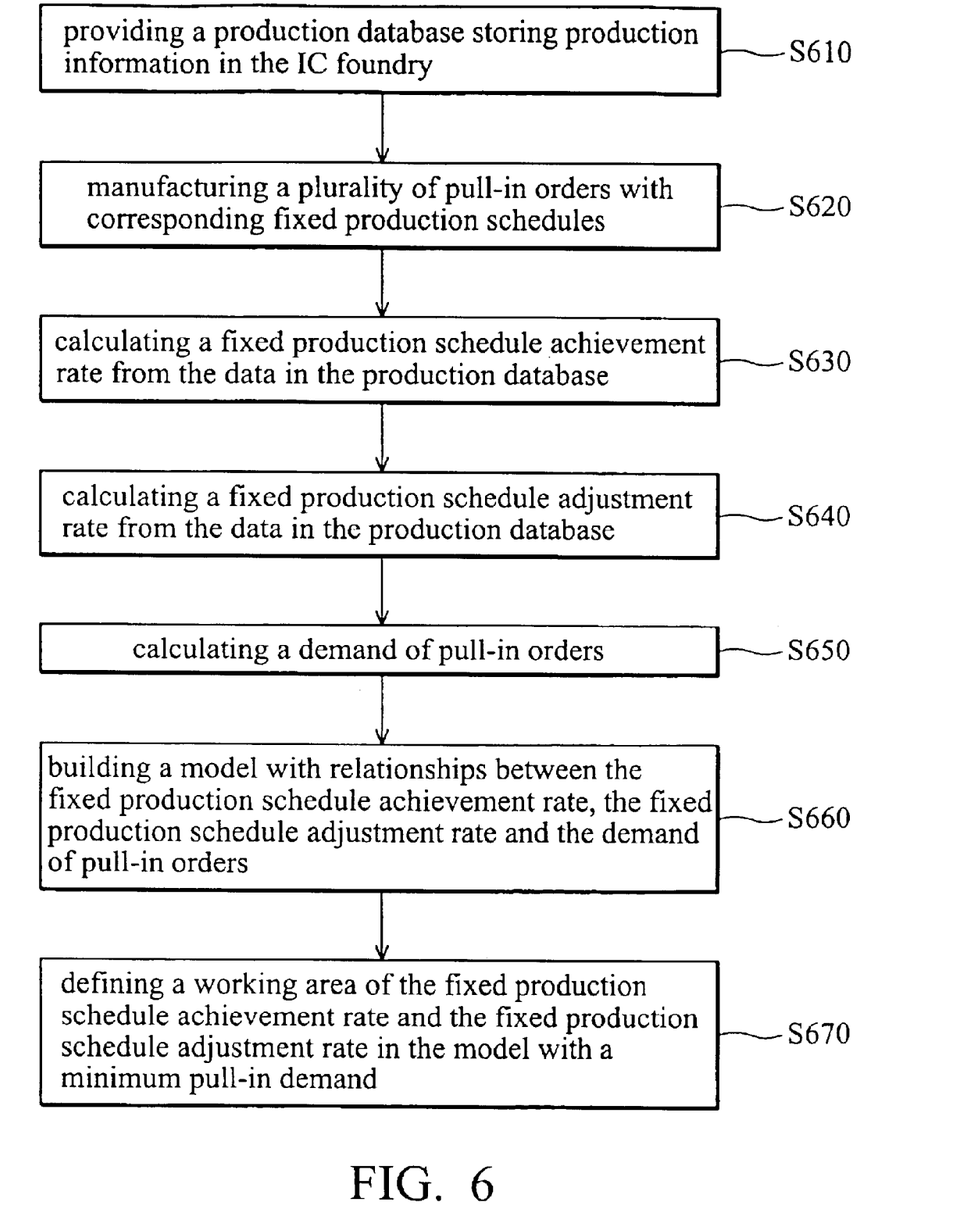
FIG. 6 is a flowchart of a method for service level determination for pull-in order service in an IC foundry, according to the system in FIG. 1.

FIG. 6 illustrates a flowchart of the method for service level determination for pull-in order service in an IC foundry, according to the system in FIG. 1. In step S610, production database 160 is provided storing production information in the IC foundry. Pull-in orders requested are then manufactured with corresponding fixed production schedules in step S620. All of the manufacturing data and results are stored into the production database 160. The pull-in model 190 calculates a fixed production schedule achievement rate, a fixed production schedule adjustment rate, and demands of pull-in orders from the data in the production database 160 in steps 630, 640 and 650, respectively. After retrieving the data from the production database 160, the pull-in model 190 builds a model with relationships between the fixed production schedule achievement rate, the fixed production schedule adjustment rate, and the demand of pull-in orders in step S660. In step S670, a working area of the fixed production schedule achievement rate and the fixed production schedule adjustment rate in the model with a minimum pull-in demand is then defined according to the model.

In a preferred embodiment, a storage medium is further provided for storing a computer program providing the method of service level determination for pull-in order service in an IC foundry. The storage medium method comprises using a computer to calculate a fixed production schedule achievement rate, a fixed production schedule adjustment rate and demands of pull-in orders from data in production database 160, building a model with relationships between the fixed production schedule achievement rate, the fixed production schedule adjustment rate and the demand of pull-in orders, and defining a working area of the fixed production schedule achievement rate and the fixed production schedule adjustment rate in the model with a minimum pull-in demand.

The methods and system of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A computer implemented system for pull-in planning in a production system of an order of a product with a demanded capacity, the system comprising:
   a capacity model, considering a plurality of capacity vectors in the production system;
   a plan engine to receive a pull-in order for the order of the product, release the demanded capacity, reserve a capacity for the pull-in order and generate a fixed production schedule for the pull-in order based on the capacity model; and
   a production schedule monitor and evaluation module to determine whether the pull-in order conforms to the fixed production schedule and whether to adjust the fixed production schedule when the pull-in order deviates from the fixed production schedule.

2. The system as claimed in claim 1, wherein the production system is an integrated circuit (IC) foundry.

3. The system as claimed in claim 2, wherein the reserved capacity for the pull-in order is reserved from a free capacity of the production system or in exchange with another order.

4. The system as claimed in claim 2, wherein the pull-in order is divided into a plurality of lots for production.

5. The system as claimed in claim 4, wherein the plan engine generates a new fixed production schedule for the pull-in order according to the deviation when receiving an adjustment determination from the production schedule monitor and evaluation module.

6. The system as claimed in claim 5, further comprising a dynamic achievement model of historical fixed production schedules for the production schedule monitor and evaluation module to refer to and determine the fixed production schedule adjustment accordingly.

7. The system as claimed in claim 6, wherein the dynamic achievement model of historical fixed production schedules comprises a relationship between fixed production schedule achievement rate and fixed production schedule adjustment rate.

8. The system as claimed in claim 7, wherein the dynamic achievement model of historical fixed production schedules further comprises a relationship between the fixed production schedule achievement rate and manufacturing capability.

9. The system as claimed in claim 8, wherein the dynamic achievement model of historical fixed production schedules further provides an optimal working area based on the relationships to adjust the fixed production schedule accordingly.

10. A computer-implemented system for pull-in planning and control in an IC foundry for an order of a product with a demanded capacity, the system comprising:

a production database storing production information of the IC foundry;

a capacity model considering a plurality of capacity vectors in the IC foundry;

a plan engine to receive a pull-in order for the order of the product, release the demanded capacity, reserve a capacity for the pull-in order and generate a fixed production schedule for the pull-in order based on the capacity model;

a dynamic achievement model of historical fixed production schedules, based on historical production information in the production database; and a production schedule monitor and evaluation module to determine whether the pull-in order conforms to the fixed production schedule and whether to adjust the fixed production schedule based on the dynamic achievement model when the pull-in order deviates from the fixed production schedule.

11. The system as claimed in claim 10, wherein the reserved capacity for the pull-in order is reserved from a free capacity of the IC foundry or in exchange with another order.

12. The system as claimed in claim 10, wherein the order of the product is divided into a plurality of lots for production.

13. The system as claimed in claim 12, wherein the plan engine generates a new fixed production schedule for the pull-in order according to a deviation when receiving an adjustment determination from the production schedule monitor and evaluation module.

14. The system as claimed in claim 13, wherein the dynamic achievement model of historical fixed production schedules comprises a relationship between fixed production schedule achievement rate and fixed production schedule adjustment rate.

15. The system as claimed in claim 14, wherein the dynamic achievement model further comprises a relationship between the fixed production schedule achievement rate and manufacturing capability.

16. The system as claimed in claim 15, wherein the dynamic achievement model further provides an optimal working area based on the relationships to adjust the fixed production schedule accordingly.

17. A computer implemented system of service level determination for pull-in order service in a production system, comprising:

a production database, storing production information of the production system;

a capacity model, considering a plurality of capacity vectors in the production system;

a plan engine to receive a pull-in order for an order of a product, release a demanded capacity of the order of the product, reserve a capacity for the pull-in order and generate a fixed production schedule for the pull-in order based on the capacity model;

a dynamic achievement model of historical fixed production schedules, based on relationships between historical fixed production schedule achievement rate, fixed production schedule adjustment rate, and manufacturing capability in the production database;

a production schedule monitor and evaluation module to determine whether the pull-in order conforms to the fixed production schedule and whether to adjust the fixed production schedule based on the dynamic achievement model when the order in process deviates from the fixed production schedule; and a pull-in model based on relationships between the historical fixed production schedule achievement rate, the fixed production schedule adjustment rate and pull-in demand to define a working area of the historical fixed production schedule achievement rate and the fixed production schedule adjustment rate in the pull-in model with a minimum pull-in demand and determine a service level accordingly.

18. The system as claimed in claim 17, wherein the order is divided into a plurality of lots.

19. The system as claimed in claim 17, wherein the production system is an IC foundry.

20. The system as claimed in claim 19, wherein the manufacturing capability in the dynamic achievement model of historical fixed production schedules is deviation limitation.

21. A method for pull-in planning in a production system of an order of a product with a demanded capacity, the method comprising the steps of:

providing a capacity model considering a plurality of capacity vectors in the production system;

receiving a pull-in order for the order of the product;

releasing the demanded capacity of the pull-in order reserving a fixed production schedule for the pull-in order based on the capacity model; and manufacturing the pull-in order according to the fixed production schedule.

22. The method as claimed in claim 21, wherein the production system is an IC foundry.

23. The method as claimed in claim 21, wherein the pull-in order of the product is divided into a plurality of lots for production.

24. The method as claimed in claim 22, further comprising the steps of:

determining whether the relevant current pull-in order conforms to the fixed production schedule; and determining whether to adjust the fixed production schedule based on a dynamic achievement model of historical fixed production schedules.

25. The method as claimed in claim 24, wherein the dynamic achievement model of historical fixed production schedules comprises a relationship between fixed production schedule achievement rate and fixed production schedule adjustment rate.

26. The method as claimed in claim 25, wherein the dynamic achievement model further comprises a relationship between the fixed production schedule achievement rate and manufacturing capability.

27. The method as claimed in claim 26, wherein manufacturing capability is deviation limitation.

28. The method as claimed in claim 27, wherein the dynamic achievement model further provides an optimal working area based on the relationships to adjust the fixed production schedule.

29. A method of service level determination for pull-in order service in an IC foundry, comprising the steps of:

provoding a production database storing production information in the IC foundry;

manufacturing a plurality of pull-in orders with corresponding fixed production schedules;

calculating a fixed production schedule achievement rate from data in the production database;

calculating a fixed production schedule adjustment rate from the data in the production database;

calculating a demand of pull-in orders;

building a model with relationships between the fixed production schedule achievement rate, the fixed production schedule adjustment rate and the demand of pull-in orders; and defining a working area of the fixed production schedule achievement rate and the fixed production schedule adjustment rate in the model with a minimum pull-in demand.

30. The method as claimed in claim 29, wherein the pull-in order is divided into a plurality of lots for production.

31. The method as claimed in claim 30, further comprising determining a service level according to the working area.

32. A storage medium for storing a computer program providing a method of pull-in planning in a production system of an order of a product with a demanded capacity, using a computer to perform the steps of:

receiving a pull-in order of an order of an IC product;

releasing the demanded capacity of the pull-in order;

reserving a capacity and generating a fixed production schedule for the pull-in order;

determining whether the pull-in order conforms to the fixed production schedule; and adjusting the fixed production schedule referring to a dynamic achievement model of historical production schedules when the pull-in order does not conform to the fixed production schedule.

33. The storage medium as claimed in claim 32, wherein the pull-in order is divided into a plurality of lots.

34. The storage medium as claimed in claim 33, wherein the reserved capacity for the pull-in order is reserved from a free capacity of the IC foundry or in exchange with another order.

35. The storage medium as claimed in claim 33, wherein the dynamic achievement model of historical fixed production schedules comprises a relationship between fixed production schedule achievement rate and fixed production schedule adjustment rate.

36. The storage medium as claimed in claim 35, wherein the dynamic achievement model further comprising a relationship between the fixed production schedule achievement rate and manufacturing capability.

37. The storage medium as claimed in claim 36, wherein manufacturing capability is deviation limitation.

38. The storage medium as claimed in claim 37, wherein the dynamic achievement model further provides an optimal working area based on the relationships to adjust the fixed production schedule.

39. A storage medium for storing a computer program providing a method of service level determination for pull-in order service in an IC foundry, using a computer to perform the steps of:

calculating a fixed production schedule achievement rate from data in a production database storing a plurality of pull-in orders with corresponding fixed production schedules production information in the IC foundry;

calculating a fixed production schedule adjustment rate from the data in the production database;

calculating a demand of pull-in orders;

building a model with relationships between the fixed production schedule achievement rate, the fixed production schedule adjustment rate, and the demand of pull-in orders; and defining a working area of the fixed production schedule achievement rate and the fixed production schedule adjustment rate in the model with a minimum pull-in demand.

40. The storage medium as claimed in claim 39, further comprising determining a service level based on the working area.

* * * * *